Figure 1:
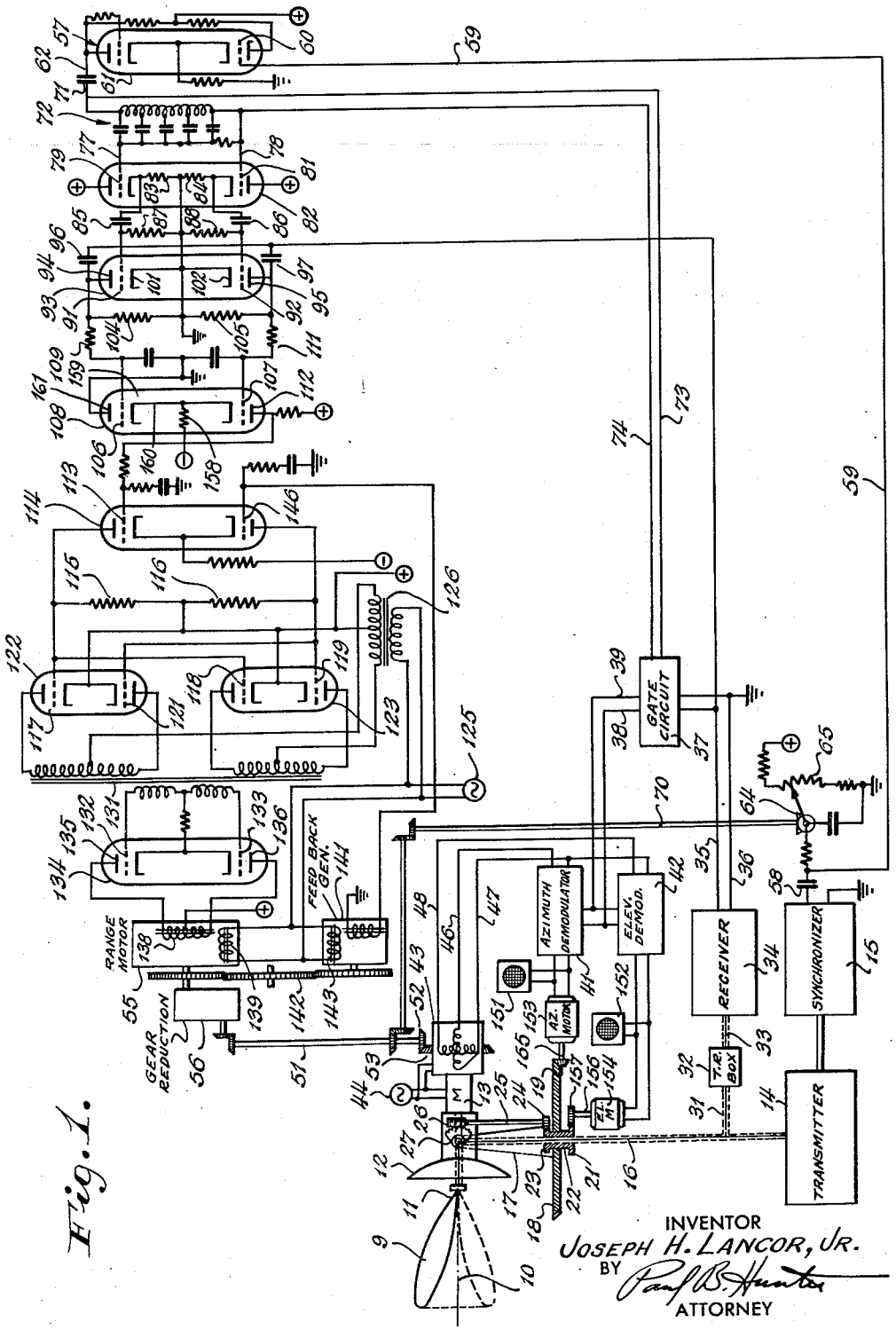

Dec. 12, 1950    J. H. LANCOR, JR    2,533,267
TRACKING APPARATUS
Filed Sept. 8, 1944    2 Sheets-Sheet 1

INVENTOR
JOSEPH H. LANCOR, JR.
BY
ATTORNEY

Dec. 12, 1950     J. H. LANCOR, JR     2,533,267
TRACKING APPARATUS

Filed Sept. 8, 1944     2 Sheets-Sheet 2

Fig. 2.

INVENTOR
JOSEPH H. LANCOR, JR.
BY
Paul B. Hunter
ATTORNEY

Patented Dec. 12, 1950

2,533,267

UNITED STATES PATENT OFFICE 2,533,267

TRACKING APPARATUS

Joseph H. Lancor, Jr., East Williston, N. Y., assignor to The Sperry Corporation, a corporation of Delaware Application September 8, 1944, Serial No. 553,191

26 Claims. (Cl. 343—11)

This invention relates to radar tracking apparatus in which a beam of radiant energy is conically scanned by rotation about an axis and the phase of the modulation envelope of received energy reflected from an object is compared to the phase of a reference signal synchronized with said rotation to provide a measure of the displacement between the object and the axis.

In apparatus of this type, it has been found that the phase relation between the modulation envelope of received energy and the rotation of the beam varies with the range of the detected object. This phase variation is due to transit time required for energy to travel from the transmitter to the object and return. The beam may rotate through an appreciable angle during this transit time thereby producing a phase shift between the envelope of received energy and the position of the beam.

This phase shift modifies error signals representing the relative displacement of the tracking axis and the object to an extent that it unbalances servomotor control. This is particularly evident in systems where the tracking axis is moved about two independent axes, usually in azimuth and elevation, to track the object. When the tracking error signals become unbalanced in such a system, it causes the tracking axis to approach the object in a spiral path.

An important object of the present invention is to provide an improved radar tracking system in which compensation is made for variations in the phase relation of received energy due to the range of the detected object.

Another object of the invention is to provide an improved radar tracking system in which tracking signals are a true measure of the displacement between the tracking axis and the detected object.

A further object of the invention is to provide an improved automatic radar tracking apparatus in which motors operate to move the tracking axis in a straight line path toward an object.

A still further object of the invention is to provide an improved entirely automatic tracking system in which tracking operations are more accurate and efficient, and tracking errors dependent upon the range of the object are adequately compensated.

Other objects of the invention, particularly with regard to arrangements of parts for convenience, and other special advantages will become apparent in connection with the following description and the accompanying drawings illustrating specific embodiments of the invention.

In the drawings,

Fig. 1 is a schematic diagram of a radar tracking system embodying one form of the invention; and Fig. 2 is a schematic diagram of a radar tracking system embodying a modified form of the invention.

In accordance with the invention, a directional transmitter radiates a beam of electromagnetic energy which is rotated about a tracking axis by causing rotation of the directional characteristic of the transmitter about said tracking axis. This rotation of the directional characteristic of the transmitter is used to develop a reference signal synchronized with the rotation. In order to compensate for movement of the beam during the time required for radiating energy to reach the object and return, a phase shift is produced between the modulation envelope of received energy reflected from the object and the reference signal developed by rotation of the directional characteristic. This phase shift is preferably accomplished automatically by controlling some phase shifting apparatus from an automatic ranging circuit.

The phase relation between the modulation envelope of received energy and the reference signal as shifted is compared and utilized to provide a measure of the displacement between the tracking axis and the object. This measure of the displacement between the tracking axis and the object may be used to indicate the tracking error or to directly operate tracking servomotors adapted to move the tracking axis toward the object.

Two arrangements for producing the relative phase shift between the modulation envelope of received energy and the reference signal are shown in the accompanying drawings. In Fig. 1 the phase of the reference signal is adjusted in accordance with the range of the object, whereas in Fig. 2 the phase of the modulation envelope of received energy is shifted according to the range of the object.

Referring first to Fig. 1, there is shown an antenna 11 provided with a parabolic reflector 12 for producing a directional beam pattern in the form of a lobe 9 extending in a selected direction from the antenna 11. The relationship between the antenna 11 and the reflector 12 is selected so the lobe 9 is directed at a small angle with respect to a central axis 10 of the parabola whereby rotation of the antenna 11 with respect to the parabola 12 as by motor 13 causes the directional characteristic of the antenna to rotate about the central axis 10 of the parabola 12, thereby conically scanning a radiated beam of electromagnetic energy about said axis, the axis of the parabola then forming a tracking axis.

The antenna is supplied with high frequency radio energy from a suitable transmitter 14 that is preferably controlled as by synchronizer 15 to periodically generate short pulses of high frequency energy. The transmitter 14 is connected as by coaxial cable 16 to the antenna 11. The entire antenna structure including the parabola 12 supported by bracket 17 mounted on a gear 18 is adapted to be turned in azimuth by pinion 19. A gear 21 mounted on sleeve 22 extending through the gear 18 and carrying a pinion 23 meshes with a gear 24 on shaft 25 rotates worm 26 to turn sector 27 for rotating the entire antenna structure about an elevation axis. For convenience, and to avoid excessive rotating joints, etc., the coaxial cable 16 extends through sleeve 22 upwardly to the antenna 11. Suitable rotating joints must, of course be provided to permit rotation of the antenna 11 by the motor 13.

That portion of radiated energy which is reflected by an object is preferably received by the same antenna 11 and transmitted by coaxial cable 16 to branch cable 31 and then to a T. R. box 32 that blocks the high power transmitted pulses from the transmitter 14, but passes weaker reflected pulses to coaxial cable 33 which is connected to a suitable receiver 34 that detects the modulation of received energy. Such a T. R. box has been described in the copending U. S. application Serial No. 406,494 in the name of Lyman et al. The output of the receiver 34 is connected by leads 35 and 36 for supplying the modulation envelope of received energy to a gate circuit 37 that is controlled from the synchronizer 15 in a manner to be described to pass only that portion of received energy which corresponds to a selected object. The gate circuit 37 may include an Eccles-Jordan or other known type of trigger circuit having two stable conditions, and capable of being operated from one of said conditions to the other by pulses applied to the leads 73 and 74 respectively. Such circuits are described on page 206 of "Theory and Applications of Electron Tubes" by H. J. Reich, published by McGraw Hill Book Company in 1939. As is well known to those skilled in the art, the voltages at certain points in an Eccles-Jordan circuit increase when the circuit is operated to one stable condition, and decrease when it is operated to the other condition. The gate circuit 37 may also include an amplifier which is normally biased to cutoff, with its bias means connected to a terminal of the trigger circuit which goes positive when the lead 73 is energized, overcoming the cutoff bias of the amplifier. Thus each pulse on the lead 73 turns on the amplifier, and each subsequent pulse on the lead 74 cuts it off. The output of the gate circuit 37 is supplied as by leads 38 and 39 to azimuth and elevation demodulators 41 and 42, where the phase relation between the modulation envelope of received energy and a signal developed by rotation of the antenna 11 is compared. The motor 13, which rotates the antenna 11, also drives a signal generator 43 which is shown as a two-phase generator for producing voltages displaced in time phase by ninety electrical degrees. The generator 43 may be energized from a source of energy 44 which also is connected to drive the motor 13. One phase of the voltage from the generator 43 is supplied as by leads 46 and 47 to the azimuth demodulator 41, whereas the other phase of the generated voltage is supplied by leads 47 and 48 to the elevation demodulator 42. Each of these demodulators may be conventional balanced demodulator circuits in which the current conducted by the individual tubes arranged in a balanced circuit depends upon the time phase relationship between voltages applied to their plates and grids, respectively. In this case, one of the applied voltages corresponds to the modulation envelope of received energy, whereas the other is a reference signal from the generator 43. The output of the azimuth demodulator, therefore, is a measure of the phase displacement between the modulation envelope of received energy and one of the voltages from generator 43.

Since the beam of radiated energy is continuously rotated about a tracking axis, the intensity of energy reflected by an object displaced from that axis will harmonically vary, according to the position of the beam with respect to the object. This intensity will vary at the same frequency at which the antenna is rotated and will have a particular phase relation dependent upon the angular orientation of the object. If the reference signal supplied to the azimuth demodulator is selected to have maximum amplitude at the time the beam from the antenna is directed horizontally, the output of the demodulator will provide a signal of a magnitude dependent upon the amount of horizontal displacement between the tracking axis and the object, and the polarity of this signal will determine whether the displacement is to the right or left of the axis. Similarly, by selecting the second voltage from the two-phase generator to have maximum amplitude when the beam pattern of the antenna is directed vertically, the output of the demodulator 42 will provide a variable magnitude reversible polarity signal dependent upon the magnitude and direction of the vertical displacement between the axis and the object.

In order to compensate for the phase shift in the modulation envelope of received energy with respect to the reference signals from the generator 43 that is caused by the angular rotation of the antenna 11 during the transit time of energy to the object and return there is shown in Fig. 1 apparatus for shifting the phase of the reference signal according to the range of the object. This may be accomplished by turning shaft 51 which carries pinion 52 meshing with gear 53 for rotating the casing of the signal generator 43. This changes the phase relation of the two-phase voltage generated by the generator 43 with respect to the angular position of the directional pattern of the antenna. The angle of this phase shift is determined by the angle whose tangent is a function of the ratio of the range to the spin frequency of the antenna which may be expressed as $$\tan \phi = \frac{\text{Time Delay}}{\text{Period of Spin Frequency}}$$

wherein $\phi$ is the phase displacement.

In the drawing, the shaft 51 is shown schematically as being directly connected from reduction gear 56 to pinion 52. Since the generator 43 moves in azimuth and elevation with the antenna, it is necessary to provide suitable mechanical connections or flexible shafting that will permit movement of the generator without disturbing the mechanical connections.

To automatically adjust the phase of the reference signals, there is shown an automatic range circuit which controls motor 55 to operate through reduction gear 56 to control the shaft 51 for shifting the casing of the reference generator 43. This automatic range circuit includes a delay multivibrator indicated generally at 57 which is triggered synchronously with the transmitted pulse from synchronizer 45. The synchronizer 45 is coupled by condenser 58 and lead 59 to one grid 60 of a double triode tube 61. The double triode 61 has the electrodes of its two electron discharge paths in a conventional multivibrator circuit to produce an output pulse on lead 62 having an adjustable phase relation with respect to the transmitted pulse. The time delay between the transmitted pulse and the pulse output of the multivibrator, appearing on lead 62 is determined by the position of slider 64 on potentiometer 65 that controls the bias applied to grid 60 of the double triode 61, thereby controlling the time delay between the application of the trigger pulse to the grid 60 and the output pulse at lead 62 in well known manner. The position of the potentiometer slider 64 is controlled by shaft 70 that is also driven from the range motor 55 that is controlled automatically by a circuit to be described.

The output pulse of lead 62 is coupled as by condenser 71 to one side of a delay line designated generally at 72 which includes suitable inductance, capacitance and resistance arranged to produce a pulse at the opposite end of the line displaced in time phase with that applied to the line by a short interval preferably of the same order of magnitude as the time duration of each transmitted pulse of energy. The pulse from condenser 71 is coupled as by lead 73 to the gate circuit 37 and the delayed pulse from the other end of the line is supplied by lead 74 to the gate circuit 37. The gate circuit is so arranged that the pulse on the lead 73 causes the gate circuit to pass the energy from the receiver 34 to the demodulators 41 and 42, whereas the delayed pulse from the lead 74 renders the gate circuit non-conductive until such time as another pulse is applied by lead 73. With this arrangement, the gate circuit blocks all signals from the receiver except those received during the time interval between the two pulses from the delay line 72. Since the phase relation of the pulse from the multivibrator 57 is controlled by the position of slider 64, the time interval during which the gate circuit conducts energy from the receiver to the demodulators is adjustable to correspond to the time at which energy from a selected object is received.

The two pulses from opposite ends of delay line 72 are applied by leads 77 and 78 to grids 79 and 81 of double triode 82 having its electrodes arranged in a balanced cathode follower circuit so output pulses appearing across cathode resistors 83 and 84 are coupled through condensers 85 and 86 across resistors 87 and 88 to be applied to grids 91 and 92 of double triode 93. The double triode 93 has its electrodes arranged in a balanced amplifier circuit to form a range error detector with its plates 94 and 95 coupled through condensers 96 and 97 respectively to lead 35 from the receiver. Since cathodes 101 and 102 of the double triode 93 are grounded and lead 36 from the receiver is grounded, it will be apparent that the modulation envelope of received energy is applied to the plates of the range error detector circuit.

Dependent upon the time relation of the envelope of received pulses with respect to the spaced pulses applied to grids 91 and 92 respectively, one side or the other of the double triode 93 will conduct more current, according to whether the time relation of the received signal is advanced or retarded with respect to the total pulses from the delay line 72. With this arrangement, a differential voltage is developed across load resistors 104 and 105 connected to plates 94 and 95 respectively. The polarity of this voltage will depend upon the direction of the range error as determined by the setting of potentiometer 65, whereas the magnitude will depend upon the amount of the range error. This differential voltage is applied to grids 106 and 107 of double triode 108 connected as a direct current amplifier. Coupling resistors 109 and 111 for the plates 94 and 95 are connected to control grids 106 and 107 respectively, to control the potential of plate 112 of the double triode 108 acting as a difference detector according to the range error signal from the range detector.

The function of tube 108 acting as a difference detector is to accept two signal input voltages from range error detector tube 93 and to deliver a single difference output voltage from tube 108 to tube 114. If the input signals to grids 107 and 106 of tube 108 are equal, the output from tube 108 to tube 114 will be zero. However, if the input signals to the aforesaid grids are unequal, a difference voltage will be applied to tube 114 from plate 108 to grid 106 of tube 114. This difference voltage is achieved through the use of the common cathode resistor 158. The output from section 159 of amplifier 108 appears across the cathode resistor, giving a degenerative or differential action thereacross. Since cathode 160 is tied in at a high negative potential through resistor 158, plate 161 which is at ground will be sufficiently positive to allow for operation of portion 159 of the tube.

This range error signal is then directly applied to grid 113 of double triode 114, having its electrodes arranged in a differential amplifier circuit to provide a differential voltage across load resistors 115 and 116, one side of which is applied directly to grids 117 and 118, and the other side of which is applied directly to grids 119 and 121 of double triodes 122 and 123 arranged in a full-wave balance modulator circuit of conventional design, that is supplied from a suitable source 125 of alternating voltage through transformer 126. The output of the full-wave balanced modulator is a variable magnitude reversible phase alternating voltage that is coupled by transformer 131 to grids 132 and 133 of double triode 134, having its plates 135 and 136 controlling opposite halves of a field winding 138 of the alternating current range motor 55 that has its other winding 139 connected to the alternating voltage source 125.

Since the phase and magnitude of the voltage applied to the winding 138 is dependent upon the relative phase of the double pulses from the delay line 72 and the pulses from receiver 34, as determined by range error detector tube 93, the range motor 55 is caused to rotate in a direction and at a speed dependent upon the range error signal to move the potentiometer slider 64 in a direction to shift the time relation of the double pulses to coincide with the received pulses. When an equilibrium condition is reached, the double pulses from the delay line 72 will be arranged symmetrically on opposite sides of received pulses from the receiver 34, thereby reducing the differential signals from the range error detector to zero and at the same time stopping the range motor 55.

In order to stabilize the range motor 55, a velocity damping signal is provided by generator 141 which is driven by gear 142 from the range motor and has one winding 143 connected to the alternating current source 125 and another winding 144 connected to the other grid 146 of the double triode 114 to introduce a degenerative signal in the differential amplifier circuit of the tube 114 corresponding to the velocity of the motor 55.

With the arrangement described, the phase relation between the modulation envelope of received energy and the reference signal from generator 43 is adjusted in accordance with the range of a selected object. This adjustment is accomplished by shifting the phase of the generator reference signals. Since the phase relation is adjusted according to the range of the object, the output of the azimuth and elevation demodulators provide accurate measures of the azimuth and elevation displacements of the detected object with respect to the tracking axis. These azimuth and elevation displacement signals may control suitable azimuth and elevation indicators 151 and 152 to indicate azimuth and elevation tracking errors.

In order to provide an automatic tracking system, these azimuth and elevation error signals may be used to directly operate azimuth and elevation servomotors 153 and 154. The azimuth motor drives through shaft 155 and gear 19 to rotate the antenna 11 in azimuth in a direction to reduce the azimuth tracking error signal. The elevation motor 154 drives through shaft 156 and pinion 157 to rotate gear 21 for turning the antenna 11 about an elevation axis in a direction to reduce the elevation error signal. Since the azimuth and elevation error signals have been corrected for errors due to the range of the object, the azimuth and elevation motors will direct the axis of the antenna toward the detected object. By controlling the speeds of these motors according to the magnitudes of the respective error signals, the tracking axis will be moved in a straight line toward the object, since the error signals have been corrected for error due to the range of the object.

The circuit shown in Fig. 1 illustrates one embodiment of the invention in which the phase of the generated reference signal is shifted. The circuit shown in Fig. 2 illustrates one arrangement for adjusting the phase relation between the modulation envelope of received energy and the reference signal by shifting the phase of the received modulation envelope. This circuit is substantially the same as that shown in Fig. 1 and identical reference numerals have been applied to corresponding elements.

In the circuit shown in Fig. 2, the reference generator 43 has its casing fixed with respect to the antenna 11 to provide reference signals having a predetermined phase relation to the rotation of the antenna. The range motor 55 drives through reduction gear 56 to position shaft 51' which functions as did shaft 51 in Fig. 1 to adjust the phase relation between the modulation envelope of received energy and the reference signal. However, shaft 51' operates through shaft 70' to control a slider 171 on a variable resistor 172 that cooperates with condenser 173 to form a phase shifting network interposed between the output of the gate circuit 37 and the inputs of the azimuth and elevation demodulators 41 and 42. The phase shifting network is selected to adjust the phase of the modulation envelope of received energy that is passed by the gate circuit 37 and corresponds to the modulation envelope of energy reflected from a selected object, since the gate circuit is controlled to pass only that energy which is received from an object at a selected range as determined by the position of range motor 55. Since the range motor 55 operates to vary the resistance of variable resistor 172, it controls the time constant and thereby the effect of the phase shifting network to shift the phase of the modulation envelope of received energy an amount corresponding to the range of the detected object.

In this modified form of the invention, the outputs of the azimuth and elevation demodulators 41 and 42 provide accurate measures of the azimuth and elevation tracking displacement errors which may be used to indicate tracking errors or to control the servomotors for automatically moving the tracking axis toward the object. Since the phase displacement between the modulation envelope of received energy and the reference signal is adjusted according to the range of the object, it is compensated for errors due to the transit time of energy to and from the detected object. The tracking error signals from the azimuth and elevation demodulators are therefore accurate signals, independent of errors due to changes in the range of the object.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An object detecting system comprising directional means for radiating electromagnetic energy having its directional characteristic rotated about an axis, means for receiving that portion of energy reflected from an object, means controlled by said rotation for developing a reference signal, and means for producing a phase shift between the modulation envelope of received energy and said reference signal according to the range of a detected object.

2. An object detecting system comprising directional means for radiating electromagnetic energy having its directional characteristic rotated about an axis, means for receiving that portion of energy reflected from an object, means controlled by said rotation for developing a reference signal, an automatic range circuit for providing a measure of the range of a detected object, and means controlled by said range circuit for producing a phase shift between the modulation envelope of received energy and said reference signal according to the range of said object.

3. An object detecting system comprising directional means for radiating electromagnetic energy having its directional characteristic rotated about an axis, means for receiving that portion of energy reflected from an object, means controlled by said rotation for developing a reference signal, an automatic range circuit for providing a measure of the range of a detected object, and means controlled by said range circuit for producing a phase shift of said reference signal according to the range of said object.

4. An object detecting system comprising directional means for radiating electromagnetic energy having its directional characteristic rotated about an axis, means for receiving that portion of energy reflected from an object, means controlled by said rotation for developing a reference signal, an automatic range circuit for providing a measure of the range of a detected object, and means controlled by said range circuit for producing a phase shift of the modulation envelope of received energy according to the range of said object.

5. An object detecting system comprising directional means for radiating electromagnetic energy having its directional characteristic rotated about an axis, means for receiving that portion of energy reflected from an object, means controlled by said rotation for developing a reference signal, means for producing a phase shift between the modulation envelope of received energy and said reference signal according to the range of a detected object, and means for comparing the phase relation between said signal and said modulation envelope as shifted by said last-named means.

6. A tracking system having a phasal reference generator comprising directional means for radiating electromagnetic energy having its directional characteristic referentially rotated about a tracking axis, means for receiving that portion of said energy reflected from an object, means for producing a phase shift between the modulation envelope of received energy and said referential rotation according to the range of a detected object, and means responsive to the phase relation of said envelope to said rotation as shifted by said last-named means for providing a measure of the relative displacement between said axis and said object.

7. A tracking system having a reference generator comprising directional means for radiating electromagnetic energy having its directional characteristic referentially rotated about a tracking axis, means for receiving that portion of said energy reflected from an object, an automatic range circuit for measuring the range of a detected object, means controlled by said range circuit for producing a phase shift between the modulation envelope of received energy and said referential rotation, and means responsive to the phase relation of said envelope to said rotation as shifted by said last-named means for providing a measure of the relative displacement between said axis and said object.

8. A tracking system comprising directional means for radiating electromagnetic energy having its directional characteristic rotated about an axis, means for receiving that portion of energy reflected from an object, means controlled by said rotation for developing a reference signal, means for producing a phase shift between the modulation envelope of received energy and said signal according to the range of an object, and means responsive to the phase relation of said envelope to said signal as shifted by said last-named means for indicating the relative displacement between said axis and said object.

9. A tracking system comprising directional means for radiating electromagnetic energy having its directional characteristic rotated about an axis, means for receiving that portion of energy reflected from an object, means controlled by said rotation for developing a reference signal, an automatic range circuit for providing a measure of the range of a detected object, means controlled by said range circuit for producing a phase shift between said signal and the modulation envelope of received energy, and means responsive to the phase relation of said envelope to said signal as shifted by said last-named means for indicating the relative displacement between said axis and said object.

10. A tracking system comprising directional means for radiating electromagnetic energy having its directional characteristic rotated about an axis, means for receiving that portion of energy reflected from an object, means controlled by said rotation for developing a reference signal, means for shifting the phase relation between said reference signal and the modulation envelope of received energy according to the range of a detected object, and automatic tracking means responsive to the phase relation between said envelope and said reference signal as shifted by said last-named means for moving said axis toward said object.

11. A tracking system comprising directional means for radiating electromagnetic energy having its directional characteristic rotated about an axis, means for receiving that portion of energy reflected from an object, means controlled by said rotation for developing a reference signal, an automatic range circuit for providing a measure of the range of a detected object, means controlled by said range circuit for shifting the phase relation between said reference signal and the modulation envelope of received energy, and automatic tracking means responsive to the phase relation of said envelope to said rotation as shifted by said last-named means for moving said axis toward said object.

12. A tracking system comprising directional means for radiating electromagnetic energy having its directional characteristic rotated about an axis, means for receiving that portion of energy reflected from an object, means controlled by said rotation for developing a reference signal, means for producing a phase shift between the modulation envelope of received energy and said reference signal according to the range of a detected object, and means responsive to the relative phase of said envelope and said reference signal as shifted by said last-named means for providing a measure of the relative displacement between said axis and said object.

13. A tracking system comprising directional means for radiating electromagnetic energy having its directional characteristic rotated about an axis, means for receiving that portion of energy reflected from an object, means controlled by said rotation for developing a reference signal, an automatic range circuit for measuring the range of a detected object, means controlled by said range circuit for producing a phase shift between the modulation envelope of received energy and said reference signal, and means responsive to the relative phase of said envelope and said signal as shifted by said last-named means for providing a measure of the relative displacement between said axis and said object.

14. A tracking system comprising directional means for radiating electromagnetic energy having its directional characteristic rotated about an axis, means for receiving that portion of energy reflected from an object, means controlled by said rotation for producing a reference signal, means for producing a phase shift of said reference signal according to the range of a detected object, and means responsive to the phase relation of the modulation envelope of received energy and said phase shifted signal for providing a measure of the relative displacement between said axis and said object.

15. A tracking system comprising directional means for radiating electromagnetic energy having its directional characteristic rotated about an axis, means for receiving that portion of energy reflected from an object, means controlled by said rotation for producing a reference signal, means for producing a phase shift of the modulation envelope of received energy according to the range of a detected object, and means responsive to the relative phase of said phase shifted envelope and said reference signal for providing a measure of the relative displacement between said axis and said object.

16. In a tracking system having a reference phase generator and a directional antenna for radiating electromagnetic energy, the method comprising the steps whereby the directional characteristic of said antenna is referentially rotated about an axis and having the phasal relation of the modulation envelope of received energy reflected from an object to said rotation provides a measure of the relative displacement between said axis and said object, the further steps in said method of measuring said displacement and increasingly adjusting the phase relation between said envelope and said rotation according to the increasing range of the object.

17. In a tracking system having a directional antenna for radiating electromagnetic energy in which the directional characteristic of said antenna is rotated about an axis, the method of measuring the relative displacement between said axis and a detected object which comprises detecting the modulation envelope of received energy reflected from an object, producing a reference signal according to the rotation of said directional characteristic, producing a phase shift between said envelope and said signal according to the range of said object, and then measuring the phase relation between said envelope and said signal.

18. In a tracking system having a directional antenna for radiating electromagnetic energy in which the directional characteristic of said antenna is rotated about an axis, the method of measuring the relative displacement between said axis and a detected object which comprises detecting the modulation envelope of received energy reflected from an object, producing a reference signal according to the rotation of said directional characteristic, producing a phase shift of said reference signal according to the range of said object, and then measuring the phase relation between said envelope and said signal.

19. In a tracking system having a directional antenna for radiating electromagnetic energy in which the directional characteristic of said antenna is rotated about an axis, the method of measuring the relative displacement between said axis and a selected object which comprises detecting the modulation envelope of received energy reflected from an object, producing a reference signal according to the rotation of said directional characteristic, producing a phase shift of said envelope according to the range of said object, and then measuring the phase relation between said envelope and said signal.

20. In a tracking system in which a beam of electromagnetic energy is referentially rotated as to phase about an axis and the phase relation between energy reflected from an object and said referential rotation is compared, means for increasingly adjusting said phase relation according to the increasing range of said object to compensate for said phase difference according to said comparison.

21. An object detecting system comprising rotating means for irradiating said object with radio energy, means for receiving modulated reflections from said object, a reference signal generator controlled by said first-named means and means for shifting the phase between said modulation envelope and said reference signal according to the distance to said object.

22. An object detecting system comprising rotating scanning means for irradiating said object, means for receiving modulated reflections from said object, phase comparator means controlled by said first-named means and means for aligning the phase between said modulation envelope and said comparator according to the range of said irradiated object.

23. An object detecting system comprising a rotating antenna for irradiating said object with electromagnetic energy, means receiving modulated reflections from said object, a reference signal generator controlled by said rotating antenna and means for correcting the phase discrepancy between said modulation envelope and said reference signal according to the distance to said object.

24. In an object detecting system, a phase correction device comprising a rotating scanner irradiating an object with radio energy, means for receiving modulated reflections from said object, a reference signal generator controlled by said rotating scanner and means for shifting the phase between said modulation and said reference signal so as to correct the phase discrepancy therebetween according to the distance from said scanner to said object.

25. In an object detecting system, a phase synchronizer comprising rotating directive means irradiating an object with radio energy, means for receiving modulated reflections from said object, a reference generator controlled by said rotating directive means given a reference signal, and means synchronizing the phase between said modulated reflectors and said reference signal according to the range between said director and said object.

26. In an object detecting system utilizing an antenna rotating about an axis at a predetermined spin frequency, a method of determining the displacement between said axis of rotation and said object comprising the steps of irradiating said object with electromagnetic energy, receiving modulated reflections therefrom and determining the displacement between said object and said axis of rotation according to time of transit of the electromagnetic energy to said object and the spin frequency of said rotating antenna.

JOSEPH H. LANCOR, Jr.

REFERENCES CITED

The following references are of record in the file of this patent:

UNITED STATES PATENTS

| Number | Name | Date |
|---|---|---|
| 2,147,810 | Alford | Feb. 21, 1939 |
| 2,231,929 | Lyman | Feb. 18, 1941 |
| 2,399,426 | Bradley | Apr. 30, 1946 |
| 2,409,448 | Rost et al. | Oct. 15, 1946 |
| 2,412,631 | Rice | Dec. 17, 1946 |
| 2,422,068 | Bedford | June 10, 1947 |
| 2,422,333 | Bedford | June 17, 1947 |
| 2,427,029 | Stearns | Sept. 9, 1947 |
| 2,448,007 | Ayres | Aug. 31, 1948 |
| 2,473,175 | Ridenour | June 14, 1949 |